Patented June 4, 1935

2,003,407

UNITED STATES PATENT OFFICE 2,003,407

DYESTUFFS OF THE TRIARYLMETHANE SERIES

Ottmar Wahl, Leverkusen-I. G.-Werk, Werner Müller, Cologne-on-the-Rhine, and Rudolf Fingado, Leverkusen-Wiesdorf, Germany, assignors to General Aniline Works, Inc., New York, N. Y., a corporation of Delaware No Drawing. Application December 14, 1933, Serial No. 702,418. In Germany December 22, 1932

4 Claims. (Cl. 260—67)

The present invention relates to new dyestuffs of the triarylmethane series, more particularly it relates to dyestuffs which in the carbinol form may be represented by the probable general formula:

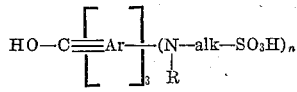

wherein Ar stands for a radical of the benzene or naphthalene series, for instance, for a benzene or naphthalene nucleus which may be substituted by alkyl, such as methyl and ethyl, alkoxy, such as methoxy and ethoxy, halogen, the amino group, a substituted amino group, such as a dialkylamino group, and the sulfonic acid group, R stands for hydrogen, alkyl, aryl, or aralkyl, such as methyl, ethyl, propyl, butyl or benzyl and phenyl, wherein the nuclei may be substituted, for instance, by halogen, methyl, ethyl, methoxy, ethoxy or the sulfonic acid group, alk stands for an alkylene group containing at least one substituent, such as the hydroxy group, an etherified hydroxy group, halogen and the sulfonic acid group, that means, alk may stand for a methylene, ethylene, propylene, butylene etc. group, containing at least one substituent, such as the hydroxy group, an alkoxy group, for instance, the methoxy group, the ethoxy group, or for a phenoxy group, a benzyloxy group, halogen or the sulfonic acid group, and $n$ stands for one of the numbers one to three.

Our new dyestuffs are obtainable according to the known methods of preparing dyestuffs of the triarylmethane series, for example, by starting with an aromatic aminosulfonic acid of the general formula:

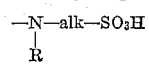

wherein Ar, R and alk mean the same as stated above, condensing the same with a suitable aldehyde to form the corresponding leuco-triarylmethane compound and oxidizing the same to form the dyestuff.

Another method of preparing our dyestuffs resides in introducing the group —alk—SO₃H into amino groups of dyestuffs of the triarylmethane series. It is self-understood that our new dyestuffs are also obtainable by introducing substituents into the alkyl group of the group

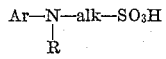

of the dyestuffs described in Letters Patent 1,921,334, or by substituting substituents present in the alkylene group by other substituents according to methods known per se.

If there are used the leuco compounds of the triarylmethane dyestuffs as starting materials, or if in the process of manufacture our new dyestuffs are obtained in the leuco form, for instance, by the action of alkali metal sulfite, they can be transformed into the dyestuffs by oxidation in the known manner.

Our new dyestuffs are generally watersoluble, dark metallic lustrous powders, dyeing animal fibres, such as wool or silk, generally reddish-violet to blue to green shades. Compared with triarylmethane dyestuffs of similar constitution, for example, with those containing instead of a sulfoalkyl a sulfobenzyl radical, they generally are distinguished by an increased solubility in water and an improved clearness of the shades obtained therewith.

The invention is illustrated by the following examples, without being limited thereto:

*Example 1*—31 parts by weight of the sodium salt of 1-n-butylphenylamino-2-hydroxypropane-3-sulfonic acid are dissolved in 100 parts by weight of hot water and condensed with 7.7 parts by weight of o-chlorobenzaldehyde at 95–100° C. and with the addition of 18 parts by weight of an aqueous hydrochloric acid of 20% strength to the leuco compound. Excess aldehyde is removed by steam distillation. The leuco compound is then oxidized in the usual manner, for example, with chromic acid to the dyestuff having in the carbinol form probably the following formula:

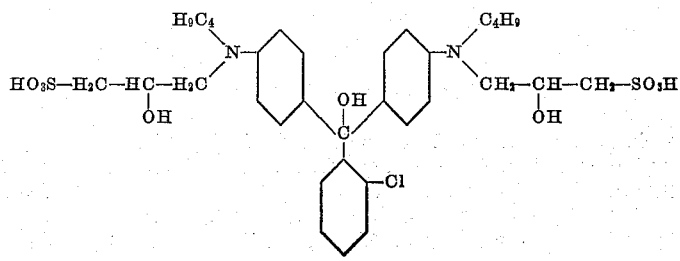

It is salted out with sodium sulfate and is obtained in form of a reddish-bronzing resin, dyeing the animal fibre clear yellowish-green shades.

By substituting the 1-n-butylphenylamino-2-hydroxy-propane-3-sulfonic acid by an equivalent quantity of 1-n-butylamino-3-methoxypropane-2-sulfonic acid and working otherwise according to the directions given in paragraph 1, there is obtained a dyestuff having in the carbinol form in the free state probably the following formula:

into about 50 parts by weight of p-phenetidine and heated for several hours at 100–110° C., until the coloration of the reaction mass has turned to a clear violet. The melt is introduced into excess aqueous hydrochloric acid, and the aqueous phenetidine solution is separated from the dyestuff. After redissolving from hot water, there is obtained a dyestuff having in the carbinol form probably the following formula:

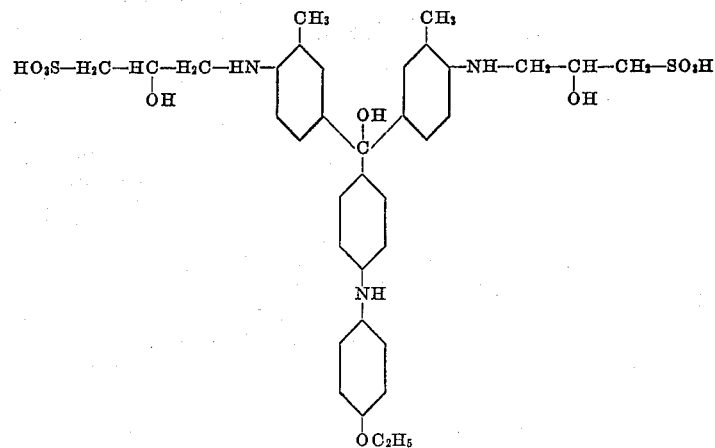

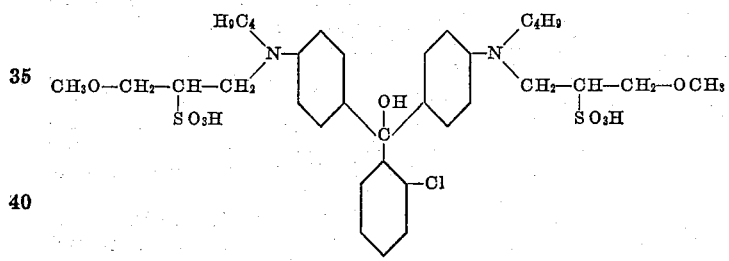

dyeing animal fibres green shades.

*Example 2*—27 parts by weight of the sodium salt of 1-o-tolylamino-2-hydroxypropane-3-sulfonic acid are condensed to the leuco triarylmethane compound as described in Example 1 with 7.5 parts by weight of p-chlorobenzaldehyde in 200 parts by weight of water and 25 parts by weight of aqueous sulfuric acid of 20% strength and oxidized in the usual manner to a dyestuff yielding bluish-green shades.

12 parts by weight of the dried dyestuff are introduced by and by at 70° C., while stirring dyeing the animal fibre violet shades.

By reacting in the manner as described in paragraph 2 with 40 parts by weight of α-tetrahydronaphthylamine at about 120° C. upon 12 parts by weight of the dried dyestuff of paragraph 1, there is obtained a black powder, dyeing the animal fibre reddish-violet shades. In the carbinol form the dyestuff has in the free state probably the following formula:

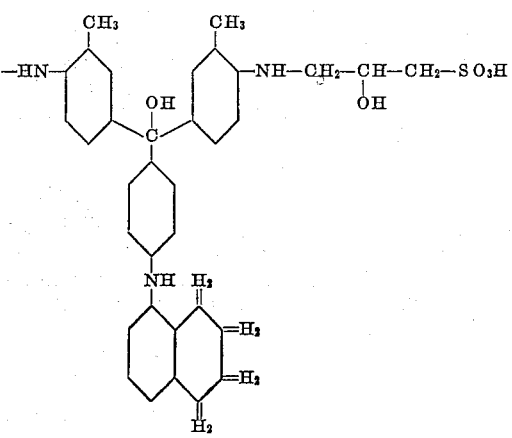

*Example 3.*—32 parts by weight of the sodium salt of 1-n-butyl-m-tolylamino-2-hydroxypropane-3-sulfonic acid are condensed to the leuco compound as described in Example 1 with 9.4 parts by weight of p-diethylaminobenzaldehyde in sulfuric acid solution, and the leuco compound is oxidized, for example, with chromic acid to the dyestuff having in the carbinol form in the free state probably the following formula:

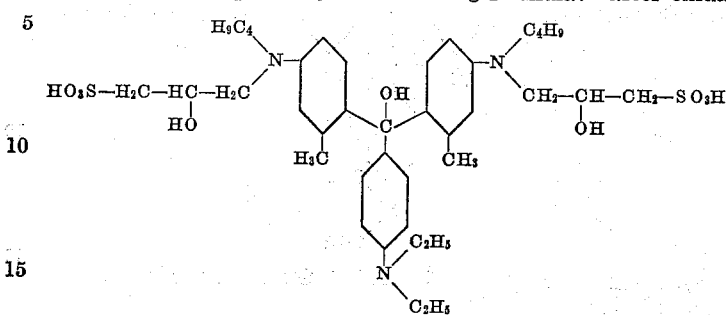

The dyestuff is obtained in form of a copper-bronzing resin, dyeing the animal fibre clear blue shades.

*Example 4.*—32 parts by weight of 1-benzyl-phenylamino-2-hydroxypropane-3-sulfonic acid are condensed with 9.4 parts by weight of p-diethylaminobenzaldehyde in 100 parts by weight of water, as described in Example 3, and the leuco compound formed is oxidized to the dyestuff with chromic acid in the usual manner. Thus is obtained a dark colored powder, dyeing the animal fibre clear violet shades. In the carbinol form the dyestuff has in the free state probably the following formula:

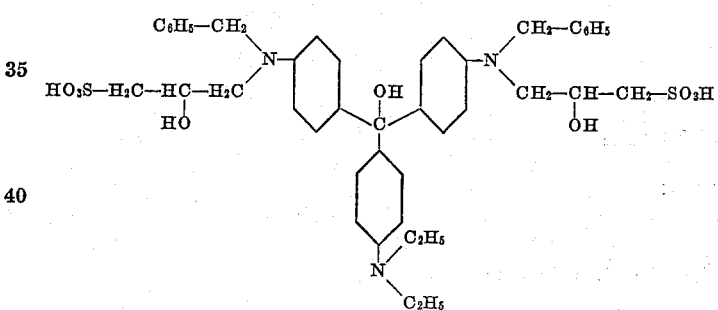

*Example 5.*—The sodium salt of the sulfuric acid ester which has been prepared in the usual manner from 62 parts by weight of the leuco compound obtainable by condensing tetramethyl-diaminobenzhydrol with 1-n-butylphenylamino-2-hydroxy-propane-3-sulfonic acid is introduced into 300 parts by weight of water, and 150 parts by weight of crystallized sodium sulfite are added, and the whole is heated in a closed vessel at a temperature of 150° C. for 4 to 5 hours. The leuco compound formed is obtained in form of greyish-blue flakes which are oxidized to the dyestuff having in the carbinol form the following formula:

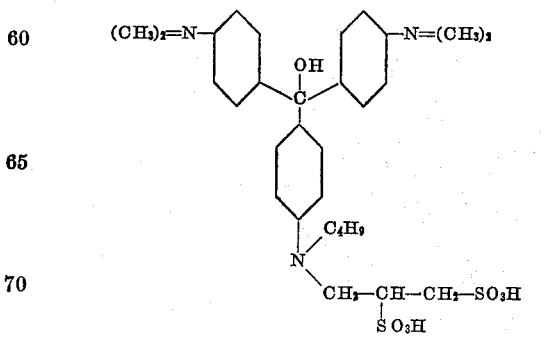

The dyestuff is obtained as a bronzing powder, easily soluble in water, dyeing the vegetable fibre a clear violet.

By condensing the above described hydrol with a corresponding quantity of 1-α-naphthylamine-propane-2.3-disulfonic acid, there is obtained after oxidation of the leuco compound a dyestuff in form of a dark powder, dyeing the animal fibre blue shades and having in the carbinol form in the free state the probable formula:

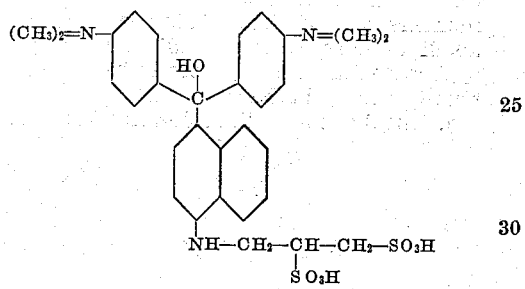

By condensing the hydrol of paragraph 1 with a corresponding quantity of 1-diphenylamino-2-hydroxypropane-3-sulfonic acid and oxidizing the leuco compound, there is obtained a dyestuff having in the carbinol form in the free state the probable formula:

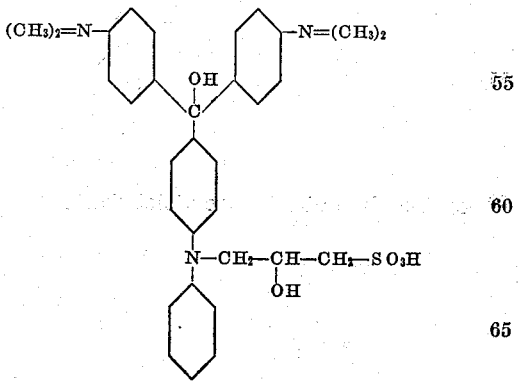

dyeing the animal fibre reddish-blue shades.

We claim:

1. Triarylmethane dyestuffs having in the carbinol form the general formula:

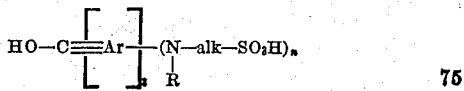

wherein Ar stands for a radical of the benzene or naphthalene series, R stands for hydrogen, alkyl, aryl or aralkyl, alk stands for an alkylene group containing at least one substituent selected from the group consisting of the hydroxy group, an etherified hydroxy group, halogen and the sulfonic acid group, and $n$ stands for one of the numbers one to three, being in form of their alkali metal salts dark metallic lustrous powders, dyeing animal fibres generally reddish-violet to blue to green shades.

2. The dyestuff of the following formula:

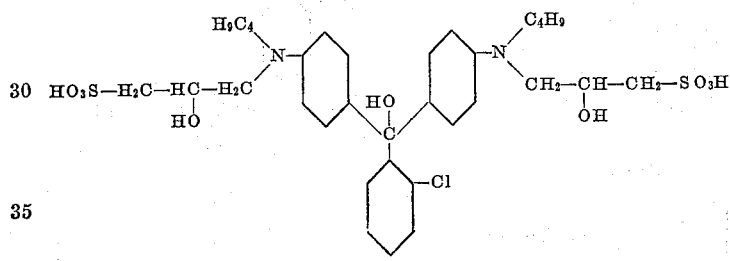

dyeing the animal fibre clear yellowsh-green shades.

3. The dyestuff of the following formula:

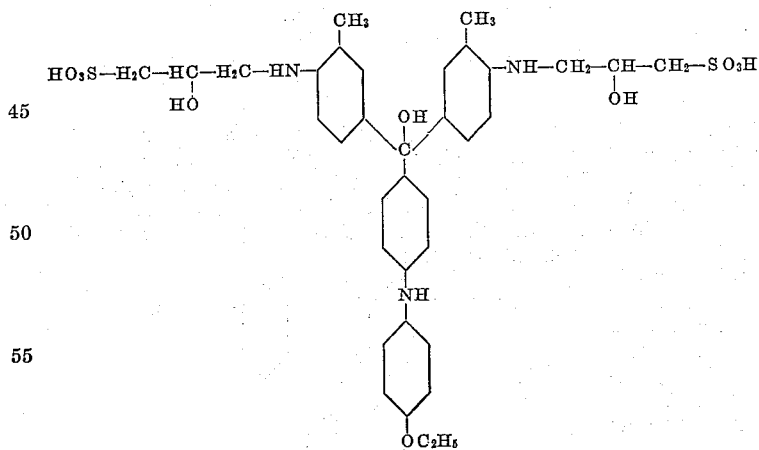

dyeing the animal fibre violet shades.

4. The dyestuff of the following formula:

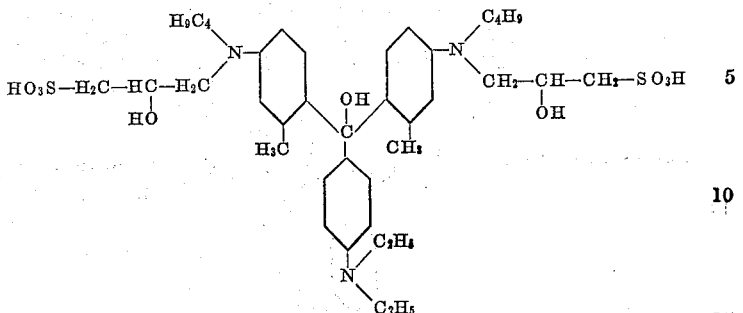

dyeing the animal fibre clear blue shades.

OTTMAR WAHL.
WERNER MÜLLER.
RUDOLF FINGADO.